United States Patent [19]

Liu et al.

[11] Patent Number: 4,790,948
[45] Date of Patent: Dec. 13, 1988

[54] LUBRICATING OIL CONTAINING DISPERSANT VISCOSITY INDEX IMPROVER

[75] Inventors: Christopher S. Liu, Poughkeepsie, N.Y.; William P. Hart, Freehold, N.J.; Maria M. Kapuscinski, Carmel, N.Y.

[73] Assignee: Texaco Inc., White Plains, N.Y.

[21] Appl. No.: 918,204

[22] Filed: Oct. 14, 1986

[51] Int. Cl.$^4$ ............. C10M 107/42; C08L 51/00
[52] U.S. Cl. ................... 252/47.5; 528/52; 528/75; 525/65; 525/71; 525/404
[58] Field of Search ......... 252/47.5, 51.5 R, 51.5 A; 525/65, 71; 528/52, 75, 73

[56] References Cited

U.S. PATENT DOCUMENTS

| 3,208,944 | 9/1965 | Cyba | 252/51.5 R |
|---|---|---|---|
| 3,732,334 | 5/1973 | Koch | 252/51.5 R |
| 4,036,766 | 7/1977 | Yamamoto | 252/51.5 R X |
| 4,130,518 | 12/1978 | Rybny | 525/7.1 X |
| 4,282,132 | 8/1981 | Benda | 252/51.5 R X |
| 4,381,375 | 4/1983 | Harrell | 525/359.2 |
| 4,490,267 | 12/1984 | Eckert | 252/51.5 R X |
| 4,638,040 | 1/1987 | Hammar | 526/245 |
| 4,666,993 | 5/1987 | Urano | 526/248 X |

FOREIGN PATENT DOCUMENTS

| 0094306 | 8/1978 | Japan | 252/51.5 R |
|---|---|---|---|
| 0595242 | 3/1960 | Canada | 252/51.5 R |

*Primary Examiner*—William R. Dixon, Jr.
*Assistant Examiner*—James M. Hunter, Jr.
*Attorney, Agent, or Firm*—Robert A. Kulason; James J. O'Loughlin; Carl G. Seutter

[57] ABSTRACT

Lubricating oils of improved properties contain a terpolymer of glycidyl methacrylate, lauryl methacrylate, and stearyl methacrylate which has been functionalized or coupled with phenothiazine and with N-methyl piperazine.

37 Claims, No Drawings

LUBRICATING OIL CONTAINING DISPERSANT VISCOSITY INDEX IMPROVER

FIELD OF THE INVENTION

This invention relates to lubricating oils. More particularly it relates to lubricating compositions characterized by improved pour point, dispersancy and viscosity index.

BACKGROUND OF THE INVENTION

As is well known to those skilled in the art, it is possible to improve the properties of a lubricating oil by addition of various components. The viscosity index may be improved; the dispersancy may be improved. Continued efforts are being made to attain improvement in these and other properties, and to attain these improvements at reduced cost. It is an object of this invention to provide an improved lubricating composition. Other objects will be apparent to those skilled in the art.

STATEMENT OF THE INVENTION

In accordance with certain of its aspects, this invention is directed to a method of preparing a functionalized polymer which comprises copolymerizing, under free radical polymerization conditions (i) first monomer containing a copolymerizable ethylenically unsaturated carbon-carbon double bond and an epoxide moiety and (ii) second monomer containing a copolymerizable ethylenically unsaturated carbon-carbon double bond and which is free of epoxide moieties thereby forming a copolymer of molecular weight $\overline{M}_n$ of 10,000–1,000,000 containing at least two pendant side chains containing epoxide moieties;

functionalizing a first portion of said side chains containing epoxide moieties with first functionalizing agent containing at least one sulfur atom and at least one hetero nitrogen atom;

functionalizing a second portion of said side chains containing epoxide moieties with, as second functionalizing agent, a primary or secondary functionalizing polyamine thereby forming a dually functionalized product polymer; and recovering said dually functionalized product polymer.

THE FIRST MONOMER

The first monomer which may be employed in practice of the process of this invention contains ethylenic unsaturation and an epoxide moiety.

Preferably the first monomer may be characterized by the formula:

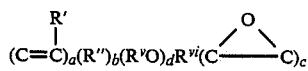

wherein

C=C is an ethylenically unsaturated double bond;
$R^v$ or $R^{vi}$ is a divalent hydrocarbon moiety selected from the group consisting of alkylene, alkarylene, aralkylene, cycloalkylene, and arylene;
R' is hydrogen or alkyl, alkaryl, aralkyl, cycloalkyl, or aryl;
R'' is a divalent moiety selected from the group consisting of —COO— and —R$^v$—; and a is an integer greater than 0;
b is an integer 0–1;
c is an integer 1–3; and
d is an integer 0–1.

In the above formula, R' may be hydrogen or a hydrocarbon selected from the group consisting of alkyl, aralkyl, cycloalkyl, aryl, and alkaryl, including such radicals when inertly substituted. When R is alkyl, it may typically be methyl, ethyl, n-propyl, iso-propyl, n-butyl, i-butyl, sec-butyl, amyl, octyl, decyl, octadecyl, etc. When R' is aralkyl, it may typically be benzyl, beta-phenylethyl, etc. When R' is cycloalkyl, it may typically be cyclohexyl, cycloheptyl, cyclooctyl, 2-methylcycloheptyl, 3-butylcyclohexyl, 3-methylcyclohexyl, etc. When R' is aryl, it may typically be phenyl, naphthyl, etc. When R' is alkaryl, it may typically be tolyl, xylyl, etc. R' may be inertly substituted i.e. it may bear non-reactive substituent such as alkyl, aryl, cycloalkyl, etc. Typically inertly substituted R' groups may include 4-methyl cyclohexyl, etc. The preferred R' groups may be lower alkyl, i.e. $C_1$–$C_{10}$ alkyl, groups including e.g. methyl, ethyl, n-propyl, i-propyl, butyls, amyls, hexyls, octyls, decyls, etc. R' may preferably be hydrogen or methyl.

In the above formula, $R^v$ or $R^{vi}$ may be a divalent hydrocarbon radical selected from the group consisting of alkylene, aralkylene, cycloalkylene, arylene, and alkarylene including such radicals when inertly substituted. When $R^v$ or $R^{vi}$ is alkylene, it may typically be methylene, ethylene, n-propylene, iso-propylene, n-butylene, i-butylene, sec-butylene, amylene, octylene, decylene, octadecylene, etc. When $R^v$ or $R^{vi}$ is aralkylene, it may typically be benzylene, beta-phenylethylene, etc. When $R^v$ or $R^{vi}$ is cycloalkylene, it may typically be cyclohexylene, cycloheptylene, cyclooctylene, 2-methylcycloheptylene, 3-butylcyclohexylene, 3-methylcyclo-hexylene, etc. When $R^v$ or $R^{vi}$ is alkarylene, it may typically be tolylene, xylylene, etc. $R^{vi}$ may be inertly substituted i.e. it may bear a non-reactive subsitutent such as alkyl, aryl, cycloalkyl, ether, etc. Typically inertly substituted $R^v$ or $R^{vi}$ groups may include 2-ethoxyethylene, carboethoxymethylene, 4-methyl cyclohexylene, etc. The preferred $R^v$ or $R^{vi}$ groups may be lower alkyl, i.e. $C_1$–$C_{10}$ alkylene, groups including e.g. methylene, ethylene, n-propylene, i-propylene, butylene, amylene, hexylene, octylene, decylene, etc. $R^v$ and $R^{vi}$ may typically be methylene —$CH_2$—.

In the above formula, R'' is a divalent moiety selected from the group consisting of —COO— and —$R^v$—. Preferably R'' is —COO—.

a is an integer, greater than 0; and preferably a is 1. It is preferred that the double bond be not on the carbon atom which forms the epoxy ring. Preferably there is only one ethylenic double bond in the molecule; and when there are more, it is preferred that they be separated i.e. not adjacent or conjugated.

b is an integer 0–1. When b is 0 and d is 1, it will be apparent that the composition includes an ether moiety. When b is 1 and d is 0, the composition includes an ester moiety if R'' is —COO—.

c is an integer 1–3. Preferably c is 1.

d is an integer 0–1. When b and d are both zero, the composition includes a hydrocarbon moiety.

In its preferred aspects, the first reactant may be characterized by the formula

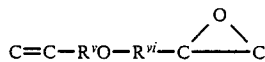

Typical first monomers may include the following the first two listed being preferred:

TABLE

| |
|---|
| allyl glycidyl ether |
| glycidyl methacrylate |
| 2-methallyl glycidyl ether |
| p-glycidyl styrene |
| styrene-p-glycidyl ether |
| 3,4-epoxy-1-pentene |
| 3,4-epoxy-1-butene |

THE SECOND MONOMER

The second monomer which may be employed in practice of the process of this invention may contain ethylenic insaturation in a carbon-to-carbon double bond and be free of epoxide moieties. These monomers may be characterized by the formula C=CA wherein A may be hydrogen or a pendant halide, carboxyl, hydrocarbon (typified by alkyl, alkaryl, aralkyl, cycloalkyl, aryl, etc.), —COOR', etc. The carbon atoms of C=CA may bear inert substituents as is the case for example with methyacrylates (wherein the inert substituent is —$CH_3$). Typically the second monomer may be a vinyl halide such as vinyl chloride, a vinyl carboxylate such as vinyl acetate, etc. It may be a styrene, a para-vinyl benzoate, etc.

Preferably the second monomer may be an acrylate having the formula

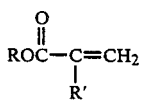

In the above formula, R may be a hydrocarbon selected from the group consisting of alkyl, aralkyl, cycloalkyl, aryl, and alkaryl including such radicals when inertly substituted. When R is alkyl, it may typically be methyl, ethyl, n-propyl, iso-propyl, n-butyl, i-butyl, sec-buty, amyl, octyl, decyl, octadecyl, etc. When R is aralkyl, it may typically be benzyl, beta-phenylethyl, etc. When R is cycloalkyl, it may typically be cycloahexyl, cycloheptyl, cyclooctyl, 2-methylcycloheptyl, 3-butylcyclohexyl, 3-methylcyclohexyl, etc. When R is aryl, it may typically be phenyl, naphthyl, etc. When R is alkaryl, it may typically be tolyl, xylyl, etc. R may be inertly substituted i.e. it may bear a non-reactive substituent such as alkyl, aryl, cycloalkyl, ether, etc. Typically inertly substituted R groups may include 2-ethoxyethyl, carboethoxymethyl, 4-methyl cyclohexyl, p-methylphenyl, p-methylbenzyl, 3-methyl-5-methylphenyl, etc. The preferred R groups may be alkyl, i.e. $C_{12}$–$C_{20}$ stearyl, etc. R may preferably be lauryl.

R' may be as above noted. Preferably R' is hydrogen or more preferably methyl.

When R' is methyl or ethyl, it is apparent that the compositions may be methacrylates or ethacrylates Typical acrylates may include:

TABLE

| | |
|---|---|
| methyl | acrylate |
| methyl | methacrylate |
| ethyl | acrylate |
| propyl | acrylate |
| butyl | methacrylate |
| octyl | acrylate |
| lauryl | acrylate |
| lauryl | methacrylate |
| lauryl | ethacrylate |
| decyl | acrylate |
| myristyl | acrylate |
| myristyl | methacrylate |
| cetyl | acrylate |
| cetyl | methacrylate |
| stearyl | acrylate |
| stearyl | methacrylate |
| stearyl | ethacrylate, etc. |
| myristyl | acrylate |
| myristyl | methacrylate |
| myristal | ethacrylate |
| cetyl | acrylate |
| cetyl | methacrylate |
| stearyl | acrylate |
| stearyl | methacrylate |
| stearyl | ethacrylate |
| eicosyl | acrylate, etc. |

The preferred second monomer may be lauryl methyacrylate.

It is a feature of this invention that the copolymer may be formed from more than one first monomer and/or more than one second monomer. For example, it may be possible to form copolymer from (i) allyl glycidyl ether as first monomer and (ii) glycidyl methacrylate as auxiliary first monomer. It may also be possible to utilize for example (iii) lauryl methacrylate as second monomer and (iv) stearyl methacrylate as auxiliary second monomer.

In one preferred embodiment, the polymer may be formed from (i) glycidyl methacrylate as first monmoer, (ii) stearyl methacrylate as second monomer, and (iii) lauryl methacrylate as auxiliary second monomer.

When two first monomers are employed (eg. glycidyl methacrylate and allyl glycidyl ether), it is possible to obtain desired results when either is present in amount of 0–100 mole % of the total of first monomer. Typically one may be present in amount of 40–60 mole % of the total, say 50 mole %.

When two second monomers are employed, they may for example be both acrylates or both methacrylates, etc. In the preferred embodiment, they may both be methacrylates wherein the alcohol-derived portions of the esters may be characterized as higher and lower moieties in the higher and lower second and auxiliary second monomers.

The preferred higher second monomer may be stearyl $C_{18}$ methacrylate. The preferred lower second monomer may be lauryl $C_{12}$ methacrylate.

The monomers may be employed in pure form or in commercially available form. One typical commercially available stearyl methacrylate for example contains the following components:

TABLE

| Component | W % |
|---|---|
| Stearyl ($C_{18}$) | 52–64 |
| Cetyl ($C_{16}$) | 30–44 |
| Less than $C_{16}$ | remainder |

It is a feature of the process of this invention that the lower second monomer contain at least about two and preferably 2–6 less carbons (in the alcohol moiety) than does the higher second monomer. The carbon number (i.e. the number of carbon atoms in the alcohol-derived portion of the ester) of the higher acrylate ester is at least about 2, and typically 2-6 more than the carbon number of the alcohol-derived moiety of the lower acrylate ester. For example if the lower pure monomer contains 10 carbon atoms (decyl), then the higher pure monomer may for example contain 12 or more carbon atoms. If the first pure monomer is myristyl ($C_{14}$), then the second pure monomer may for example be cetyl ($C_{16}$). It will be noted that "even-numbered moieties" are designated and preferred because of their commercial availability. When available, the esters derived from alcohols containing an odd number of carbon atoms may be employed.

When the esters employed are commercially available esters containing several homologues, then the carbon number to be employed in determining the alcohols which may be employed is the weight average carbon number, as determined for example by quantitative gas chromatographic analysis.

The preferred product polymers may be those which use as second and as auxiliary second monomers, those obtained from (i) commercially available lauryl methacrylate and (ii) commercially available stearyl methacrylate.

It is preferred to produce the desired product by copolymerization.

PREPARATION OF COPOLYMER

Copolymerization is typically effected by adding first monomer(s) and second monomer(s) to a reaction operation in mole ratio of 2:1–12:1, preferably 4:1–8:1, say about 6:1. There is preferably also added to the reaction operation polymerization-solvent in amount of 25–75 parts, say 47 parts per 100 parts of total reactants. Typical solvent may include hydrocarbons such as toluene, xylene, gas oil, lubricating oil cuts, etc. A preferred solvent may be the lubricating oil in which the product is to be used. Another preferred solvent may be a solvent neutral oil typified by SNO-5 or 145 P Pale Turbine Oil.

There is added to the reaction mixture 0.018–0.35 parts, say 0.05 parts of $C_1$–$C_{20}$ alkyl mercaptan which serves as chain transfer agent (polymer chain length modifier) and 20–75 parts say 50 parts of diluent oil typified by 100E pale oil. There is also added to the reaction mixture 0.05–0.15 parts, say 0.05 parts of dicumyl peroxide, dibenzoyl peroxide, or azobisisobutyronitrile which serves as polymerization initiator.

The reaction system may be purged with inert gas such as nitrogen and heated to 40° C.–150° C., preferably 40° C.–100° C., say 83° C. for 1–10 hours, preferably 1–6 hours, say 2.5 hours. Typically heating is continued until two consecutive identical refractive indices are obtained. Then additional azobisisobutyronitrile and solvent may be added. The temperature may be raised to 60° C.–160° C., preferably 80° C.–120° C., say 100° C. and maintained at that level for 10–120 minutes, say 60 minutes.

Product copolymer typically contains the same molar proportions as are present in the reaction mixture i.e. it contains moieties derived from the first reactant in amount of about 65–92 mole %, preferably 80–90 mole %, say 85 mole % and moieties derived from the second reactant in amount of 8–35 mole %, preferably 10–20 mole %, say 15 mole %. This corresponds to a mole ratio of 2–12:1, preferably 4–8:1 say 6:1.

In the preferred embodiment in which the first monomer is glycidyl methacrylate and the second monomer is stearyl methacrylate and lauryl methacrylate, the final polymer may contain 2–15 mole %, say 8 mole % derived from glycidyl methacrylate, 60–70 mole %, say 65 mole % derived from lauryl methacrylate and 15–38 mole %, say 27 mole % derived from stearyl methacrylate.

The preferred molecular weight $\overline{M}_n$ of the copolymer may be 10,000–1,000,000, preferably 20,000–180,000, more preferably 60,000–100,000, say about 98,000, corresponding to a $\overline{M}_w$ of 38,000–450,000, preferably 200,000–250,000, say 213,000. Control of the molecular weights to within this desired range is obtained by use of chain transfer agents such as $C_1$–$C_{20}$ alkyl (eg lauryl) mercaptans and by control of the ratio of monomer to initiator.

The product polymer is typically obtained as a 25–80 w%, preferably 30–70 w%, say 50 w% solution in the solvent. It may be recovered and used as is or preferably it may be formulated into a concentrate containing polymer.

Typical polymers which may be utilized in practice of the process of this invention may include the following:

TABLE

| | |
|---|---|
| A. | 8 mole % glycidyl methacrylate |
| | 64 mole % lauryl methacrylate |
| | 28 mole % stearyl methacrylate |
| B. | 4 mole % glycidyl methacrylate |
| | 70 mole % lauryl methacrylate |
| | 26 mole % stearyl methacrylate |
| C. | 2 mole % allyl glycidyl ether |
| | 70 mole % methyl acrylate |
| | 28 mole % stearyl methacrylate |
| D. | 4 mole % 2-methallyl glycidyl ether |
| | 70 mole % decyl acrylate |
| | 26 mole % stearyl methacrylate |
| E. | 8 mole % 3,4-epoxy-1-pentene |
| | 65 mole % lauryl acrylate |
| | 27 mole % stearyl methacrylate |

It is a feature of the polymers of this invention as so prepared that they are characterized by their ability to be utilized as pour depressants in hydrocarbon systems typified by lubricating oils.

When used as a pour depressant, the polymer may be present in the system in pour depressant amount. This may typically be 0.05–0.3 parts, preferably 0.07–0.25 parts, say 0.01 parts per 100 parts of eg. lubricating oil. By the use of quantities of this magnitude it is possible to convert an oil having a pour point of minus 5° F. to 20° F., say 10° F. (as measured by ASTM D-97) to a product having a pour point of minus 10° F.–minus 25° F., say minus 20° F.

THE FIRST FUNCTIONALIZING AGENT

The polymer containing at least two pendant side chains containing epoxide moieties may be subjected to a first functionalizing or coupling reaction in which a first portion of the side chains containing epoxide moieties is functionalized or coupled with a first functionalizing agent which contains at least one sulfur atom and at least one hetero nitrogen atom.

It is a feature of the process of this invention that there may be bonded (or coupled) onto these oil-soluble, substantially linear, carbon-carbon, backbone polymers, units derived from a first functionalizing agent which contains at least one sulfur atom and at one hetero nitrogen atom to provide anti-oxidant properties in the product polymer.

It is believed that best anti-oxidant activity in the desired polymer product is attained by bonding (or coupling) heterocyclic compounds which exhibit antioxidant activity when present in unbonded form. Preferred of these latter is phenothiazine.

The first functionalizing agent which may be employed may be monocyclic or polycyclic; and the nitrogen and sulfur may be contained in the same or a different ring. In the preferred embodiment, the funtionalizing agent may be polycyclic and the nitrogen and sulfur may be in the same heterocyclic ring. The sulfur may be a hetero atom as is the case with phenothiazine or it may be pendant on a hetero-nitrogen ring as in a mercapto-imidazole.

The first functionalizing agent can be a heterocyclic/aromatic or heterocyclic compound containing sulfur and hetero-nitrogen. The compounds which may be used as the first functionalizing agent include:

(1) phenothiazine and ring or/and N-substituted phenothiazine. Substituents may include hydrocarbon radicals selected from the group consisting of alkyl, cycloalkyl, aryl, alkaryl, or heterocyclic, including such radicals when containing oxygen, nitrogen, sulfur, halide or combinations thereof.

Typically, the ring-substituted phenothiazine may include alkyl phenothiazines, alkoxy phenothiazines, hydroxy alkyl phenothiazines, aminophenothiazines, nitrophenothiazines, 3-formyl-10-alkyl-phenothiazine, 2-amino-4-(2-phenthiazinyl) thiazole, alpha (2-phenothiazinyl) thioacetomorpholide, etc . . .

(2) mercapto-imidazoles or mercaptobenzimidazoles, such as 2-mercaptobenzimidazole, 2-mercapto toluimidazole or 2-mercapto-1-ethyl imidazole; etc. 2-mercapto-imidazole.

(3) thiazoles or benzothiazoles, such as 4-methyl-5-vinylthiazole, 2-amino-4-methylthiazole, 2-mercapto-4-phenylthiazole, 2-mercaptobenzothiazole; etc.

(4) mercapto-triazoles and mercaptobenzotriazoles, such as 3-mercapto-1H-1,2,4-triazole, 3-amino-5-methylthio-1H-1,2,4-triazole; etc.

(5) thiadiazoles, benzothiadiazoles, thiazolines and benzothiazolines, thiazolidine. They may include 2-mercapto-thiazoline, 1,2,5-thiadiazoline; etc.

(6) mercaptopyrimidine, including 2-mercaptopyrimidine; etc.

(7) mercaptopyridines, such as 2-mercapto pyridine, 4-mercapto-pyridine, 2-mercaptopyridine-N-oxide; etc.

(8) mercaptooxazoles and mercaptobenzoxazoles, such as 2-mercaptobenzoxazole; etc.

(9) mercaptoaniline, thiomorpholine, 6-mercaptopurine, 2-thiophene-ethyl amine.

Preferred of the functionalizing agents is phenothiazine which is a three-ring compound containing the nitrogen and sulfur in the same ring.

In practice of the process of this invention, 100 parts of charge polymer containing epoxy groups may be added to 100–1000 parts, say 300 parts of diluent-solvent. Typical diluent-solvent may be a hydrocarbon solvent such as mineral oil n-hexane, n-heptane, or tetrahydrofuran. Preferred solvent may be a commercial mineral oil. Reaction mixture may then be heated to reaction conditions of 60° C.–180° C., preferably 150° C.–170° C., say 155° C.

First functionalizing agent, typically phenothiazine, is admitted in amount of 1–40 parts, say 5 parts, as a solution in 2–20 parts, say 8 parts of diluent-solvent-typically tetrahydrofuran (THF). Phenothiazine may be added alternatively as a powder or as a slurry in oil or other solvent used as reaction medium.

It is a feature of this invention that the first functionalizing agent may impart activity both as a pour depressant and an antioxidant when the product is present in anti-oxidant amounts of 0.5–1.5 parts, say 1 part per 100 parts of eg. a lubricating oil.

It is a feature of the process of this invention that it is preferable to effect functionalization with the first functionalizing agent and the second functionalizing agent simultaneously.

The second functionalizing agent is a primary or secondary functionalizing or coupling polyamine.

The poly amines may typically be characterized by the formula

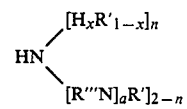

In this formula, a may be a number 1–20, preferably 1–10, say 5; x is 0 or 1; and n may be 0 or 1.

In the above compound, R' may be hydrogen or a hydrocarbon group selected from the group consisting of alkyl, aralkyl, cycloalkyl, aryl, and alkaryl, including such radicals when inertly substituted. When R' is alkyl, it may typically be methyl, ethyl, n-propyl, iso-propyl, n-butyl, i-butyl, sec-butyl, amyl, octyl, decyl, octadecyl, etc. When R' is a aralkyl, it may typically be benzyl, beta-phenylethyl, etc. When R' is cycloalkyl, it may typically be cyclohexyl, cycloheptyl, cyclooctyl, 2-methylcycloheptyl, 3-butycyclohexyl, 3-methylcyclohexyl, etc. When R' is aryl, it may typically be phenyl, naphthyl, etc. When R' is alkaryl, it may typically be tolyl, xylyl, etc. R' may be inertly substituted i.e. it may bear a non-reactive substituent such as alkyl, aryl, cycloalkyl, ether, etc. Typically inertly substituted R' groups may include 2-ethoxyethyl, carbonethoxymethyl, 4-methyl cyclohexyl, etc. The preferred R' groups may be hydrogen or lower alkyl, i.e. $C_1$–$C_{10}$ alkyl, groups including eg. methyl, ethyl, n-propyl, i-propyl, butyls, amyls, hexyls, octyls, decyls, etc. R' may preferably be hydrogen.

R''' may be a hydrocarbon selected from the same group as R' subject to the proviso that R'' is divalent and contains one less hydrogen atom. R''' may be alkylene, alkarylene, aralkylene, cycloalkylene, or arylene. In an alternative embodiment, R'' may together with the nitrogen atoms may form a cycloaliphatic or an aromatic ring typified by piperazine

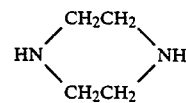

Typical polyamines which may be employed may include the following:

TABLE propylenediamine
diethylenetriamine
di-isopropylenetriamine
triethylenetetramine
tetraethylenepentamine
pentaethylenehexamine

TABLE-continued piperazine
N—methyl piperazine
N—aminomethyl piperazine
N—(beta-aminoethyl) piperazine
N—hydroxy piperazine In one embodiment, R' may be hydrogen and R'''—CH$_2$CH$_2$—. It is preferred however that the amine be a piperazine, preferably, N-methyl piperazine.

In practice of the process of this invention, 100 parts of charge polymer bearing epoxide units may be added to 100–1000 parts, say 300 parts of diluent-solvent. Typical diluent-solvent may be a hydrocarbon solvent such as n-hexane, n-heptane, tetrahydrofuran, or mineral oil. Preferred solvent may be a commercial mineral oil of low sulfur content and high content of saturated hydrocarbons. Reaction mixture may then be heated to reaction conditions of 60° C.–180° C., preferably 150° C.–170° C., say 155° C.

Preferably first functionalizing agent, typically phenothiazine, in amount of 1–20 parts, say 4 parts may be mixed with 0.5–20 parts, say 2 parts of second functionalizing agent, typically N-methyl piperazine, and the mixture may be admitted to the reaction system as a solution thereof in a diluent-solvent.

Reaction is typically carried out at 60° C.–180° C., say 155° C. for 0.5–20 hours, preferably 2–10 hours, say 5 hours during which time coupling of functionalizing agent onto the base EPM or EPT polymer occurs.

Typically the product may by contain 0.1–60, say 3 units derived from first functionalizing agent and 0.1–60, say 3 units derived from second functionalizing agent per 1000 carbon atoms of the charge backbone polymer.

Typical dually functionalized product polymers which may be used in practice of the process of this invention may include units derived from the following:

TABLE

| | |
|---|---|
| F. | 8 mole % glycidyl methacrylate |
| | 60 mole % lauryl methacrylate |
| | 24 mole % stearyl methacrylate |
| | 4 mole % phenothiazine |
| | 4 mole % N—methyl piperazine |
| G. | 6 mole % glycidyl methacrylate |
| | 66 mole % lauryl methacrylate |
| | 22 mole % stearyl methacrylate |
| | 3 mole % phenothiazine |
| | 3 mole % N—methyl piperazine |
| H. | 5 mole % allyl glycidyl ether |
| | 64 mole % methyl acrylate |
| | 26 mole % stearyl methacrylate |
| | 2 mole % phenothiazine |
| | 3 mole % N—methyl piperazine |
| I. | 4 mole % 2-methallyl glycidyl ether |
| | 68 mole % decyl acrylate |
| | 24 mole % myristyl methacrylate |
| | 2 mole % 2-mercaptobenzimidazole |
| | 2 mole % propylene diamine |
| J. | 8 mole % 3,4-epoxy-1-pentene |
| | 61 mole % lauryl acrylate |
| | 23 mole % stearyl methacrylate |
| | 4 mole % 2-amino-4-methyl thiazole |
| | 4 mole % tetraethylene pentamine |

The preferred composition of this invention is the first listed, F.

It is a feature of this invention that the so-prepared polymer may find use in lubricating oils as multifunctional additive (e.g. viscosity index improvers which provide pour depressant, dispersant, and anti-oxidant properties, etc) when present in effective amount of 0.2–5 w%, preferably 0.4–4 w%, say 2.0 w%.

Lubricating oils in which the multifunctional additives of this invention may find use may include automotive, aircraft, marine, railway, etc. oils; oils used in spark ignition or compression ignition; summer or winter oils; etc. Typically the lubricating oils may be characterized by an ibp of 570° F.–660° F., say 610° F.; an ep of 750° F.–1200° F., say 1020° F.; and an API gravity of 25–31, say 29.

A typical lubricating oil in which the polymer of this invention may be present may be a standard SAE 5W-30 hydrocarbon motor oil formulation having the following composition:

TABLE

| | W % |
|---|---|
| Base Oil | 86 |
| Viscosity Index Improver | 5 |
| (10 w % ethylene-propylene copolymer in 90% inert oil) | |
| Standard Additive Package: | 9 |
| Polyisobutenyl ($\overline{M}_n$ 1290) succinimide (dispersant); | |
| calcium sulfonate (detergent); | |
| Zinc dithiophosphate (anti-wear); | |
| di-nonyl diphenyl amine (anti-oxidant); | |
| 4,4'-methylene-bis (2,6-di-t-butyl phenol) (antioxidant); | |

Use of the additive of this invention makes it possible to readily increase the viscosity index by 25–40 units, say 35 units and to obtain improved ratings on the tests measuring the dispersancy of the system. The viscosity index is determined by ASTM Test D-445.

Practice of the process of this invention will be apparent to those skilled in the art from the following examples wherein, as elsewhere in this specification, all parts are parts by weight unless otherwise set forth. Control examples are designated by an asterisk.

DESCRIPTION OF THE PREFERRED EMBODIMENTS

EXAMPLE 1

In this example which describes the best mode presently known of carrying out the first step, there is charged to a reaction vessel, under nitrogen, 8.04 g glycidyl methacrylate first monomer, 129.73 g lauryl methacrylate second monomer, 63.22 g of stearyl methacrylate auxiliary second monomer, 0.13 g of lauryl mercaptan chain transfer agent, and 36.76 g of mineral oil polymerization solvent.

The reaction mixture is heated to 83° C. with agitation under nitrogen; and 0.64 g of azobisisobutyronitrile (AIBN) polymerization initiator is added. The reaction mixture is stirred for 3 hours, followed by addition of 0.13 g of azobisisobutyronitrile and 262.72 g of 100E Pale Oil. Heating at 83° C. is continued for 1.5 hour and then the temperature is raised to 100° C. for an additional hour. The reaction mixture is then cooled to room temperature.

EXAMPLE 2

The reaction conditions are the same as in Example 1. Charge included 10.73 g of glycidyl methacrylate, 127.47 g of lauryl methacrylate, and 62.79 g of stearyl methacrylate. All other regent quantities are the same as in Example 1.

EXAMPLE 3

Reaction conditions are the same as in Example 1. Charge includes 12.07 g of glycidyl methacrylate, 126.58 g of lauryl methacrylate, and 62.34 g of stearyl methacrylate. All other reagent quantities are the same as in Example 1.

EXAMPLE 4

Reaction conditions are the same as in Example 1. Charge includes 16.08 g of glycidyl methacrylate, 123.89 g of lauryl methacrylate, and 61.02 g of stearyl methacrylate. All other reagent quantities are the same as in Example 1.

EXAMPLE 5

Reaction conditions are the same as in Example 1. Charge includes 0.32 g of AIBN. All other reagent quantities are the same as in Example 4.

EXAMPLE 6

Reaction conditions are the same as in Example 1. Charge includes 0.32 g of AIBN followed by a second addition of 0.07 g of AIBN. All other reagent quantities are the same as in Example 1.

EXAMPLE 7

Reaction conditions are the same as in Example 1. Charge includes 0.06 g of lauryl mercaptan. All other reagent quantities are the same as in Example 4.

EXAMPLE 8

Reaction conditions are the same as in Example 1. Charge includes 0.06 g of lauryl mercaptan. All other reagent quantities were the same as in Example 1.

EXAMPLE 9

Reaction conditions are the same as in Example 1. Charge includes 0.32 g of AIBN followed by a second addition of 0.07 g of AIBN. Also added is 0.06 g of lauryl mercaptan. All other reagent quantities are the same as in Example 1.

EXAMPLE 10

In this example there is added to the product of Example 1 in the same reaction vessel 11.18 g of phenothiazine. The reaction temperature is raised to 160 C. and maintained for 5 hours. The reaction mixture is then cooled to room temperature.

EXAMPLE 11

In this example, there is added to the product of Example 2 in the same reaction vessel a mixture of 7.46 g of phenothiazine and 3.75 g of N-methylpiperazine. The reaction conditions are the same as in Example 10.

EXAMPLE 12

In this example there is added to the product of Example 1 in the same reaction vessel a mixture of 5.63 g phenothiazine and 2.83 g of N-methylpiperazine. The reaction conditions are the same as in Example 10.

EXAMPLE 13

In this example there is added to the product of Example 1 in the same reaction vessel a mixture of 4.48 g of phenothiazine and 3.37 g of N-methylpiperazine. The reaction conditions are the same as in Example 10.

EXAMPLE 14

In this example there is added to the product of Example 1 in the same reaction vessel a mixture of 2.23 g of phenothiazine and 4.50 g of N-methylpiperazine. The reaction conditions are the same as in Example 10. The disclosure of Example 1 and 14 represent the best mode presently known of preparing the polymer of this invention.

EXAMPLE 15

In this example there is added to the product of Example 1 in the same reaction vessel a mixture of 1.11 g of phenothiazine and 5.06 g of N-methylpiperazine. The reaction conditions are the same as in Example 10.

Results comparable to those of Example 11 may be obtained if the polymer is as follows:

TABLE

| EXAMPLE | POLYMER |
|---|---|
| 16 | A |
| 17 | B |
| 18 | C |
| 19 | D |
| 20 | E |

EXAMPLE 21

In these Examples, a Base Blend is employed as follows:

| Composition | Wt. % |
|---|---|
| Solvent Neutral Oil 130 | 75.25 |
| Solvent Neutral Oil 335 | 21.74 |
| Zinc Dithiophosphate | 1.12 |
| Dinonyldiphenylamine | 0.39 |
| Magnesium Sulfonate | 1.50 |
| Poly(siloxane) | 150 ppm |
| ANALYSES | |
| Kinematic Viscosity, cst, 40 C | 31.50 |
| 100 C | 5.36 |
| Pour Point, F D-97 | +5 |
| Ash, Sulfated % D-874 | 0.93 |
| Phosphorus, % X-Ray | 0.11 |
| Sulfur, % X-Ray Total | 0.40 |
| Zinc, % X-Ray | 0.12 |
| Magnesium, % | 0.33 |
| Cold Cranking Simulator, cP, −18 C | 1660 |

The compositions of this invention of Examples 1, 10, and 12–15 were blended at a 4.85 w% polymer level in the above Base Blend; and the resultant composition was tested for Dispersancy by the Bench VC Test. In this test, the dispersancy is measured against three standards (excellent/good/poor) and improved dispersancy is evidenced by lower ratings.

TABLE

| Example | Polymer of Example | BVCT Result | Standards |
|---|---|---|---|
| 21* | 1 | 97.4 | 8/29/68 |
| 22* | 10 | 98.5 | 10/20/56 |
| 23 | 12 | 31.2 | 6/34/61 |
| 24 | 13 | 23.0 | 10/20/55 |
| 25 | 14 | 14.0 | 10/20/55 |
| 26 | 15 | 13.4 | 10/20/55 |

From the above, it will be apparent to those skilled in the art that the product of Example 21* (which was not functionalized at all) and the product of Example 22* which was not functionalized with phenothiazine only are not characterized by the desired degree of dispersancy.

Examples 23-26 which, in accordance with this invention, contain polymer which is functionalized by phenothiazine and amine, are characterized by desired degree of dispersancy.

In a further series of tests, the compositions of Examples 1, 10, and 12-15 were blended at 0.75 w % polymer concentration in SNO-130 oil and evaluated in the Bench Oxidation Test. In this test, a solution containing 1.5 w% of test polymer in SNO-130 oil is blown with air while heated and stirred. Samples are withdrawn periodically for analysis by Differencial Infrared Absorption (DIR) to observe changes in the carbonyl vibration band at 1710 CM$^{-1}$. Higher carbonyl vibrational band intensity indicates a lower thermal-oxidative stability of the sample.

TABLE

| Example | Polymer of Example | Oxidation Index @ 144 hours |
|---|---|---|
| 27* | 1 | 13.1 |
| 28* | 10 | 3.7 |
| 29 | 12 | 4.4 |
| 30 | 13 | 4.4 |
| 31 | 14 | 3.4 |
| 32 | 15 | 6.8 |

From the above, it will be apparent to those skilled in the art that the composition of Example 27* fails to exhibit anti-oxidation ability. Note that the compositions of Examples 29-32 of the instant invention exhibit anti-oxidant characteristics.

In a further series of tests, the Thickening Effect is measured.

The compositions of Examples 10 and 12-15 are blended at 5 w % polymer composition in SNO-100 and the kinematic viscosity at 100° C. is measured.

TABLE

| Example | Polymer of Example | Kinematic Viscosity cst @ 100° C. | Thickening Effect CST |
|---|---|---|---|
| 33 | 10 | 14.78 | 6.65 |
| 34 | 12 | 18.90 | 10.77 |
| 35 | 13 | 17.22 | 9.09 |
| 36 | 14 | 14.17 | 6.04 |
| 37 | 15 | 19.45 | 11.32 |

From the above Table, it is apparent that the products formulated with the additives of this invention provide increased thickening effect.

Although this invention has been illustrated by reference to specific embodiments, it will be apparent to those skilled in the art that various changes and modifications may be made which clearly fall within the scope of this invention.

What is claimed is:

1. The method of preparing a functionalized polymer which comprises
    copolymerizing, under free radical polymerization conditions, (i) first monomer containing a copolymerizable ethylenically unsaturated carbon-carbon double bond and an epoxide moiety and (ii) second monomer containing a copolymerizable ethylenically unsaturated carbon-carbon double bond and which is free of epoxide moieties thereby forming a copolymer of molecular weight $\overline{M}_n$ of 10,000-1,000,000 containing at least two pendant side chains containing epoxide moieties;
    functionalizing a first portion of said side chains containing epoxide moieties with first functionalizing agent containing at least one sulfur atom and at least one hetero nitrogen atom;
    functionalizing a second portion of said side chains containing epoxide moieties with, as second functionalizating agent, a primary or secondary functionalizing polyamine thereby forming a dually functionalized product polymer; and
    recovering said dually functionalized product polymer.

2. The method of claim 1 wherein said molecular weight is 20,000-100,000.

3. The method of claim 1 wherein said first monomer is

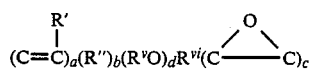

wherein
C═C is an ethylenically unsaturated double bond;
R$^v$ or R$^{vi}$ is a divalent hydrocarbon moiety selected from the group consisting of alkylene, alkarylene, aralkylene, cycloalkylene, and arylene;
R' is hydrogen or alkyl, alkaryl, aralkyl, cycloalkyl, or aryl;
R" is a divalent moiety selected from the group consisting of —COO— and —R$^v$—; and
a is an integer greater than 0;
b is an integer 0-1;
c is an integer 1-3; and
d is an integer 0-1.

4. The method of claim 1 wherein said first monomer is allyl glycidyl ether, glycidyl methacrylate, or 2-methyallyl glycidyl ether.

5. The method of claim 1 wherein said second monomer is an acrylate ester.

6. The method of claim 1 wherein said first functionalizing agent is a phenothiazine, a mercapto-imidazole, a mercaptobenzimidazole, a thiazole, a benzothiazole, a mercapto-triazole, a mercaptobenzotriazole, a thiadiazole, a thiazoline, a thiazolidine, a mercaptopyrimidine, a mercaptopyridine, a mercaptooxazole, a mercaptobenzoxazole, a mercaptoaniline, a thiomorpholine, or a mercaptopurine.

7. The method of claim 1 wherein said first functionalizing agent is phenothiazine.

8. The method of claim 1 wherein said second functionalizing agent is a primary or secondary polyamine.

9. The method of claim 1 wherein said second functionalizing agent is N-methyl piperazine.

10. The method of preparing a functionalized polymer which comprises
    copolymerizing, under free radical polymerization conditions, (i) first monomer containing a copolymerizable ethylenically unsaturated carbon-carbon double bond and an epoxide moiety and (ii) second monomer containing a copolymerizable ethylenically unsaturated carbon-carbon double bond and which is free of epoxide moieties thereby forming a copolymer of molecular weight $\overline{M}_n$ of 10,000-1,000,000 containing at least two pendant side chains containing epoxide moieties;
    functionalizing a portion of said side chains containing epoxide moieties with first functionalizing agent containing at least one sulfur atom and at least one hetero nitrogen atom thereby forming a functionalized product polymer; and;

recovering said functionalized product polymer.

11. The method of claim 10 wherein said first functionalizing agent is a phenothiazine, a mercapto-imidazole, a mercaptobenzimidazole, a thiazole, a benzothiazole, a mercapto-triazole, a mercaptobenzotriazole, a thiadiazole, a thiazoline, a thiazolidine, a mercaptopyrimodine, a mercaptopyridine, a mercaptooxazole, a mercaptobenzoxazole, a mercaptoaniline, a thiomorpholine, or a mercaptopurine.

12. The method of claim 10 wherein said first functionalizing agent is phenothiazine.

13. The method of preparing a functionalized polymer which comprises
copolymerizing, under free radical polymerization conditions, (i) first monomer containing a copolymerizable ethylenically unsaturated carbon-carbon double bond and an epoxide moiety and (ii) second monomer containing a copolymerizable ethylenically unsaturated carbon-carbon double bond and which is free of epoxide moieties thereby forming a copolymner of molecular weight $\overline{M}n$ of 10,000–1,000,000 containing at least two pendant side chains containing epoxide moieties;
functionalizing a portion of said side chains containing epoxide moieties with, as second functionalizing agent, a primary or secondary functionalizing polyamine thereby forming a functionalized product polymer; and
recovering said functionalized product polymer.

14. A functionalized polymer comprising moieties derived from (i) first monomer containing a copolymerizable ethylenically unsaturated carbon-carbon double bond and an epoxide moiety and (ii) second monomer containing a copolymerizable ethylenically unsaturated carbon-carbon double bond and which is free of epoxide moieties, said polymer backbone bearing at least two pendant side chains containing epoxide moieties, a first portion of said side chains containing epoxide moieties having been functionalized with first functionalizing agent containing at least one sulfur atom and at least one hetero nitrogen atom, and a second portion of said side chains containing epoxide moieties having been functionalized with, as second functionalizing agent, a primary or secondary functionalizing polyamine.

15. A functionalized polymer as claimed in claim 13 wherein said polymer has a molecular weight $\overline{M}_n$ of 10,000–1,000,000.

16. A functionalized polymer as claimed in claim 12 wherein said first functionalizing agent is a phenothiazine, a mercapto-imidazole, a mercaptobenzimidazole, a thiazole, a benzothiazole, a mercapto-triazole, a mercaptobenzotriazole, a thiadiazole, a thiazoline, a thiazolidine, a mercaptopyrimidine, a mercaptopyridine, a mercaptooxazole, a mercaptobenzoxazole, a mercaptoaniline, a thiomorpholine, or a mercaptopurine.

17. A functionalized polymer is claimed in claim 12 wherein said first functionalizing agent is phenothiazine.

18. A functionalized polymer as claimed in claim 12 wherein said second functionalizing agent is a primary or secondary polyamine.

19. A functionalized polymer as claimed in claim 12 wherein said second functionalizing agent is N-methyl piperazine.

20. A functionalized polymer comprising moieties derived from (i) first monomer containing a copolymerizable ethylenically unsaturated carbon-carbon double bond and an epoxide moiety and (ii) second monomer containing a copolymerizable ethylenically unsaturated carbon-carbon double bond and which is free of epoxide moieties, said polymer backbone bearing at least two pendant side chains containing epoxide moieties, at least a portion of said side chains containing epoxide moieties having been functionalized with functionalizing agent containing at least one sulfur atom and at least one hetero nitrogen atom.

21. A functionalized polymer as claimed in claim 20 wherein said polymer has a molecular weight $\overline{M}n$ of 10,000–1,000,000.

22. A functionalized polymer as claimed in claim 20 where said first functionalizing agent is a phenothiazine, a mercapto-imidazole, a mercaptobenzimidazole, a thiazole, a benzothiazole, a mercapto-triazole, a mercaptobenzotriazole, a thiadiazole, a thiazoline, a thiazolidine, a mercaptopyrimidine, a mercaptopyridine, a mercaptooxazole, a mercaptobenzoxazole, a mercaptoaniline, a thiomorpholine, or a mercaptopurine.

23. A functionalized polymer as claimed in claim 20 wherein said functionalizing agent is a phenothiazine.

24. A functionalized polymer comprising moieties derived from (i) first monomer containing a copolymerizable ethylenically unsaturated carbon-carbon double bond and an epoxide moiety and (ii) monomer containing a copolymerizable ethylenically unsaturated carbon-carbon double bond and which is free of epoxide moieties, said polymer backbone bearing at least two pendant side chains containing epoxide moieties, at least a portion of said side chains containing epoxide moieties having been functionalized with, as second functionalizing agent, a primary or secondary polyamine.

25. A functionalized polymer as claimed in claim 24 wherein said second functionalizing agent is N-methyl piperazine.

26. A composition comprising a functionalized polymer comprising moieties derived from (i) first monomer containing a copolymerizable ethylenically unsaturated carbon-carbon double bond and an epoxide moiety and (ii) monomer containing a copolymerizable ethylenically unsaturated carbon-carbon double bond and which is free of epoxide moieties, said polymer side chains containing epoxide moieties, a first portion of said side chains containing epoxide moieties having been functionalized with first functionalizing agent containing at least one sulfur atom and at least one hetero nitrogen atom, and a second portion of said side chains containing epoxide moieties having been functionalized with functionalizing agent, containing at least one sulfur atom and at least one hetero nitrogen atom; and
an inert diluent-solvent.

27. A lubricating oil composition comprising a major portion of a lubricating oil and a minor effective viscosity index improving portion of, as additive, a functionalized polymer comprising moieties derived from (i) first monomer containing a copolymerizable ethylenically unsaturated carbon-carbon double bond and an epoxide moiety and (ii) second monomer containing a copolymerizable ethylenically unsaturated carbon-carbon double bond and which is free of epoxide moieties, said polymer backbone bearing at least two pendant side chains containing epoxide moieties, a first portion of said side chains containing epoxide moieties having been functionalized with first functionalizing agent containing at least one sulfur atom and at least one hetero nitrogen atom, and a second portion of said side chains containing epoxide moieties having been functionalized with, as second functionalizing agent, a primary or secondary functionalizing polyamine.

28. A lubricating oil composition as claimed in claim 27 wherein said functionalized polymer has a molecular weight $\overline{M}_n$ of 10,000-1,000,000.

29. A lubricating oil composition as claimed in claim 27 wherein said first monomer is

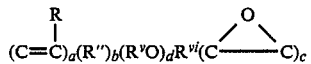

wherein

C=C is an ethylenically unsaturated double bond;

$R^v$ or $R^{vi}$ is a divalent hydrocarbon moiety selected from the group consisting of alkylene, alkarylene, aralkylene, cycloalkylene, and arylene;

R' is hydrogen or alkyl, alkaryl, aralkyl, cycloalkyl, or aryl;

R" is a divalent moiety selected from the group consisting of —COO— and —$R^v$—; and a is an integer greater than 0;

b is an integer 0-1;

c is an integer 1-3; and d is an integer 0-1.

30. A lubricating oil composition as claimed in claim 27 wherein said first monomer is allyl glycidyl ether, glycidyl methacrylate, or 2-methallyl glycidyl ether.

31. A lubricating oil composition as claimed in claim 27 wherein said second monomer is an acrylate ester.

32. A lubricating oil composition as claimed in claim 27 wherein said first functionalizing agent is a phenothiazine, a mercapto-imidazole, a mercaptobenzimidazole, a thiazole, a benzothiazole, a mercapto-triazole, a mercaptobenzotriazole, a thiadiazole, a thiazoline, a thiazolidine, a mercaptopyrimidine, a mercaptopyridine, a mercaptooxazole, a mercaptobenzoxazole, a mercaptoaniline, a thiomorpholine, or a mercaptopurine.

33. A lubricating oil composition as claimed in claim 27 wherein said first functionalizing agent is phenothiazine.

34. A lubricating oil composition as claimed in claim 27 wherein said second functionalizing agent is a primary or secondary polyamine.

35. A lubricating oil composition as claimed in claim 27 wherein said second functionalizing agent is N-methyl piperazine.

36. A lubricating oil composition as claimed in claim 27 wherein said viscosity index improving portion is 0.2-5 w%.

37. A lubricating oil composition comprising a major portion of a lubrication oil and 0.2-5 w% of a functionalized polymer containing moieties derived from glycidyl methacrylate and lauryl methacrylate and stearyl methacrylate, said polymer having been functionalized with phenothiazine and N-methyl piperazine.

* * * * *